(12) United States Patent
McBride et al.

(10) Patent No.: US 10,503,417 B2
(45) Date of Patent: Dec. 10, 2019

(54) DATA ELEMENT VALIDATION IN CONSISTENCY GROUPS

(71) Applicant: International Business Machines Corporation, Armonk, NY (US)

(72) Inventors: Gregory E. McBride, Vail, AZ (US); David C. Reed, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/935,013

(22) Filed: Mar. 25, 2018

(65) Prior Publication Data
US 2019/0294347 A1 Sep. 26, 2019

(51) Int. Cl.
*G06F 3/06* (2006.01)

(52) U.S. Cl.
CPC .......... *G06F 3/0619* (2013.01); *G06F 3/0644* (2013.01); *G06F 3/0673* (2013.01)

(58) Field of Classification Search
CPC ..... G06F 3/0619; G06F 3/0644; G06F 3/0673
USPC .......................................................... 711/154
See application file for complete search history.

(56) References Cited

U.S. PATENT DOCUMENTS

| | | |
|---|---|---|
| 8,037,345 B1 | 10/2011 | Iyer et al. |
| 8,244,792 B2 | 8/2012 | Boaz et al. |
| 9,218,252 B1 * | 12/2015 | Revur ................. G06F 16/2365 |
| 9,665,435 B2 | 5/2017 | Fujita et al. |
| 9,804,957 B1 | 10/2017 | Chopra et al. |
| 2017/0109239 A1 | 4/2017 | Gostev et al. |
| 2017/0131934 A1 | 5/2017 | Kaczmarczyk et al. |
| 2018/0024891 A1 | 1/2018 | Wu et al. |

OTHER PUBLICATIONS

Zhang, Y., et al. "ViewBox: Integrating Local File Systems with Cloud Storage Services," Open access to the Proceedings of the 12th USENIX Conference on File and Storage Technologies (FAST '14), Feb. 17-20, 2014, Santa Clara CA.

* cited by examiner

*Primary Examiner* — Hua J Song
(74) *Attorney, Agent, or Firm* — Nelson and Nelson; Daniel P. Nelson; Alexis V. Nelson

(57) ABSTRACT

A method for validating data is disclosed. In one embodiment, such a method includes reading a data element from a volume. The method determines a location of the data element within the volume. This location is mapped to a particular data set stored on the volume, such as by mapping the location to the particular data set using a volume table of contents (VTOC) associated with the volume. The method further determines a first identifier (e.g., a creation date) associated with the particular data set and compares this first identifier to a second identifier (e.g., a creation date) appended to the data. If the first identifier matches the second identifier, the method validates the data. A corresponding system and computer program product are also disclosed.

20 Claims, 6 Drawing Sheets

DATA ELEMENT VALIDATION IN CONSISTENCY GROUPS

BACKGROUND

Field of the Invention

This invention relates to systems and methods for validating data elements, such as when forming consistency groups.

Background of the Invention

In data replication environments such as Peer-to-Peer-Remote-Copy ("PPRC") or Extended-Remote-Copy ("XRC") environments, data is mirrored from a primary volume, residing on primary storage system, to a secondary volume, residing on a secondary storage system, in order to maintain two consistent copies of the data. The primary and secondary storage systems may be located at different sites, perhaps hundreds or even thousands of miles away from one another. In the event the primary storage system fails, I/O may be redirected to the secondary storage system, thereby enabling continuous operations. When the primary storage system is repaired, I/O may resume to the primary storage system.

In data replication systems such as PPRC or XRC, data corruption may occur on the primary volumes. This data corruption may be caused by user error, program code error, malicious activities, or the like. Some of this data corruption may take place outside of normal access methods that are used to access data on the primary volumes and prevent unauthorized access. As a result, certain types of intentional and unintentional data corruption may be present on the primary volumes that goes undetected.

For example, if a user is authorized to perform track copy operations, the user may copy tracks over another data set without the access method preventing the corruption. Another example is a program bug that writes data to a wrong location, or bugs in operations such as point-in-time copies or other track-level copies that can lead to data being written to a wrong target location. Backup methodologies that look for a track update indicator to replicate a changed track may copy the corruption and possibly replace valid backup data with corrupt data.

In view of the foregoing, what are needed are systems and methods to validate data elements (e.g., blocks or tracks of data), such as when copying data elements from a first location to a second location. Ideally, such systems and methods will detect instances of data corruption so that valid data is not overwritten with corrupt data.

SUMMARY

The invention has been developed in response to the present state of the art and, in particular, in response to the problems and needs in the art that have not yet been fully solved by currently available systems and methods. Accordingly, the invention has been developed to provide improved systems and methods for validating data. The features and advantages of the invention will become more fully apparent from the following description and appended claims, or may be learned by practice of the invention as set forth hereinafter.

Consistent with the foregoing, a method for validating data is disclosed. In one embodiment, such a method includes reading a data element from a volume. The method determines a location of the data element within the volume. This location is mapped to a particular data set stored on the volume, such as by mapping the location to the particular data set using a volume table of contents (VTOC) associated with the volume. The method further determines a first identifier (e.g., a creation date) associated with the particular data set and compares this first identifier to a second identifier (e.g., a creation date) appended to the data. If the first identifier matches the second identifier, the method validates the data.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

Figure 1:
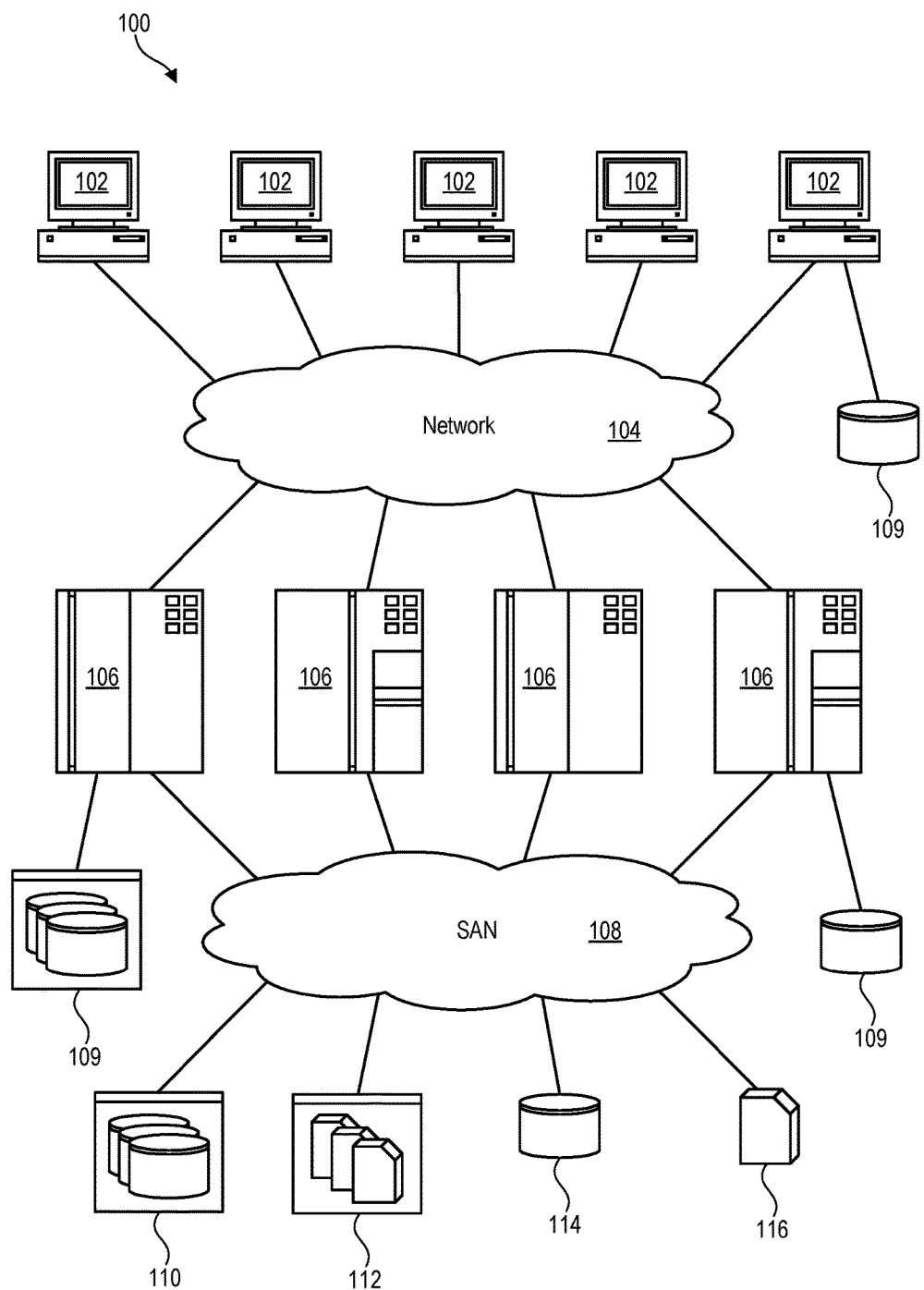
FIG. 1 is a high-level block diagram showing one example of a network environment in which systems and methods in accordance with the invention may operate.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where systems and methods in accordance with the invention may be implemented. The network environment 100 is presented only by way of example and not limitation. Indeed, the systems and methods disclosed herein may be applicable to a wide variety of network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 109 (e.g., arrays of hard-disk drives, solid-state drives, tape drives, etc.). These computers 102, 106 and direct-attached storage systems 109 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110 of hard-disk drives or solid-state drives, tape libraries 112, individual hard-disk drives 114 or solid-state drives 114, tape drives 116, CD-ROM libraries, or the like. To access a storage system 110, 112, 114, 116, a host system 106 may communicate over physical connections from one or more ports on the host 106 to one or more ports on the storage system 110, 112, 114, 116. A connection may be through a switch, fabric, direct connection, or the like. In certain embodiments, the servers 106 and storage systems 110, 112, 114, 116 may communicate using a networking standard such as Fibre Channel (FC).

Figure 2:
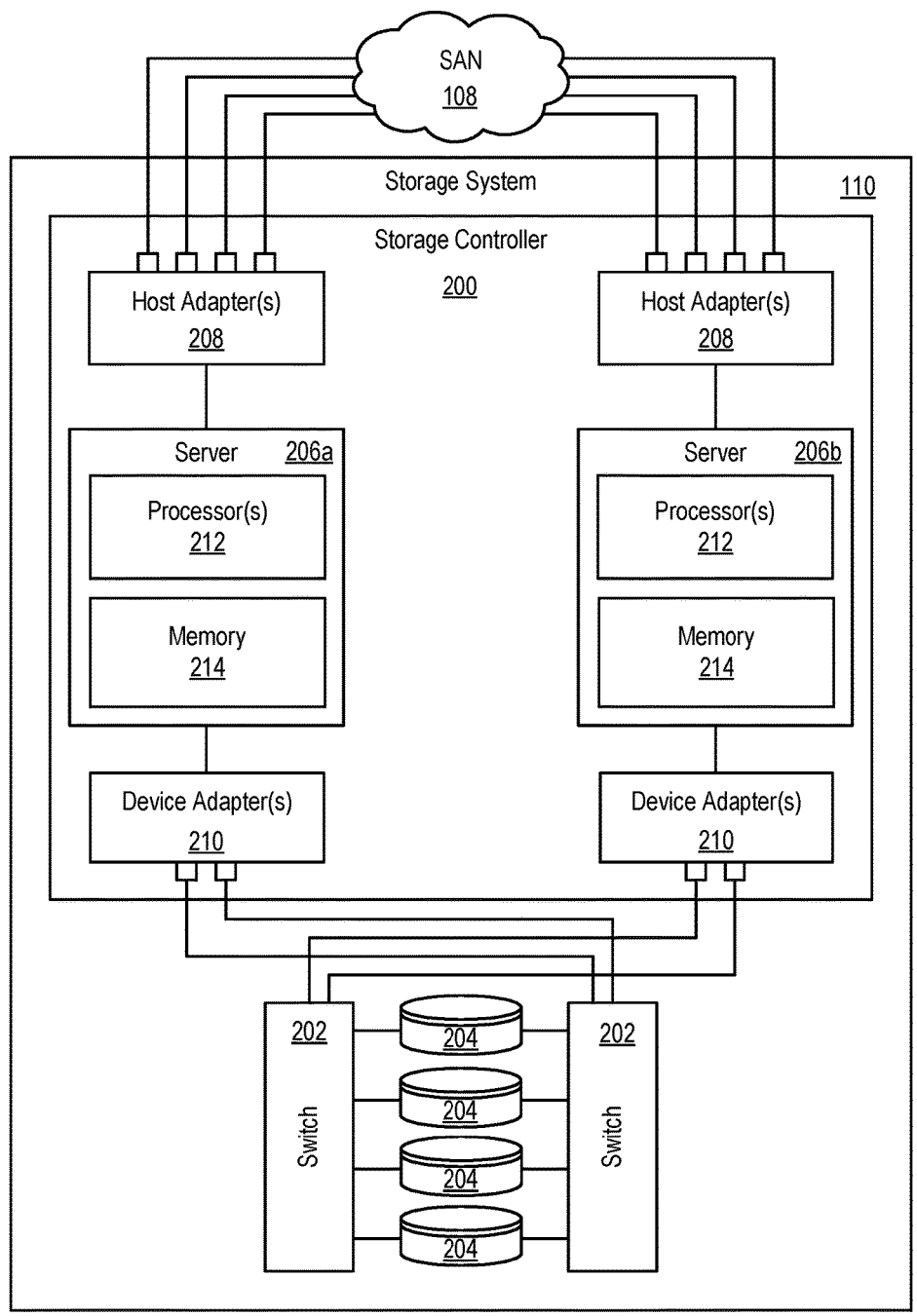
FIG. 2 is a high-level block diagram showing one example of a storage system for use in the network environment of FIG. 1.

Referring to FIG. 2, one embodiment of a storage system 110 containing an array of hard-disk drives 204 and/or solid-state drives 204 is illustrated. As shown, the storage system 110 includes a storage controller 200, one or more switches 202, and one or more storage drives 204, such as hard disk drives 204 or solid-state drives 204 (such as flash-memory-based drives 204). The storage controller 200 may enable one or more hosts 106 (e.g., open system and/or mainframe servers 106 running operating systems such z/OS, zVM, or the like) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. The servers 206 may host at least one instance of these software modules. These software modules may manage all read and write requests to logical volumes in the storage drives 204.

One example of a storage system 110 having an architecture similar to that illustrated in FIG. 2 is the IBM DS8000™ enterprise storage system. The DS8000™ is a high-performance, high-capacity storage controller providing disk storage that is designed to support continuous operations. Nevertheless, the apparatus and methods disclosed herein are not limited to operation with the IBM DS8000™ enterprise storage system 110, but may operate with any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented only by way of example and is not intended to be limiting.

Figure 3A:
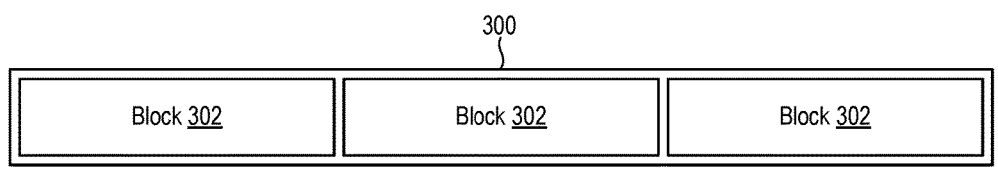
FIGS. 3A and 3B are high-level block diagrams showing storage of data in non-extended-format data sets (FIG. 3A) and extended format data sets (FIG. 3B).
Figure 3B:
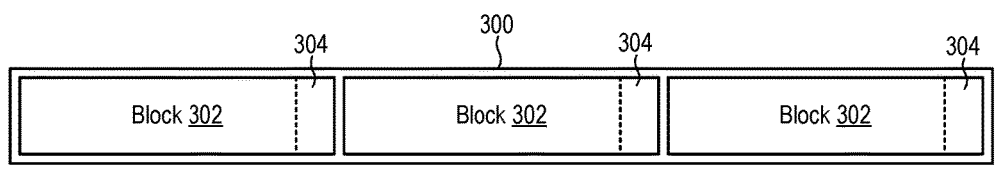

Referring to FIG. 3, in certain embodiments, a storage system 110 such as that described in FIG. 2 may host logical volumes that are in turn used to store data sets. For the purposes of this disclosure, these data sets may be characterized as extended format data sets and non-extended-format data sets, depending on the way data is stored and the type of metadata that is included with the data. In general, data associated with a data set may be stored in units or data elements referred to as blocks 302 that are contained in larger units such as tracks 300. In extended format data sets, each block 302 may include a section 304 that contains metadata describing data in the block 302, as shown in FIG. 3B. This metadata may be appended to the blocks 302 as blocks are written to the underlying storage media. This metadata may include information such as a relative byte number of each block 302.

In certain embodiments, an identifier (e.g., a data set creation date, or the like) may be added to the metadata of a block 302 or track 300. This identifier may tie the block 302 or track 300 to the extended format data set to which it belongs. Identifiers such as creation date typically will not change for the life of a extended format data set and thus are useful to determine if data elements (e.g., blocks 302, tracks 300, etc.) are associated with a particular extended format data set. These identifiers may be included in every block 302 or track 300 associated with an extended format data set. By contrast, each block 302 of a non-extended-format data set, as shown in FIG. 3A, may not include the section 304 and associated metadata that is included in an extended format data set.

As will be explained in more detail hereinafter, systems and methods in accordance with the invention may use the metadata associated with each block 302 of an extended format data set to detect potential instances of data corruption. More specifically, the metadata associated with each block 302 of an extended format data set may be used to validate data in the block 302 when the data is copied from one location to another, such as from a primary volume to a secondary volume, or from a source volume to a target volume. This, in turn, may prevent valid data from being overwritten with corrupt data.

Figure 4:
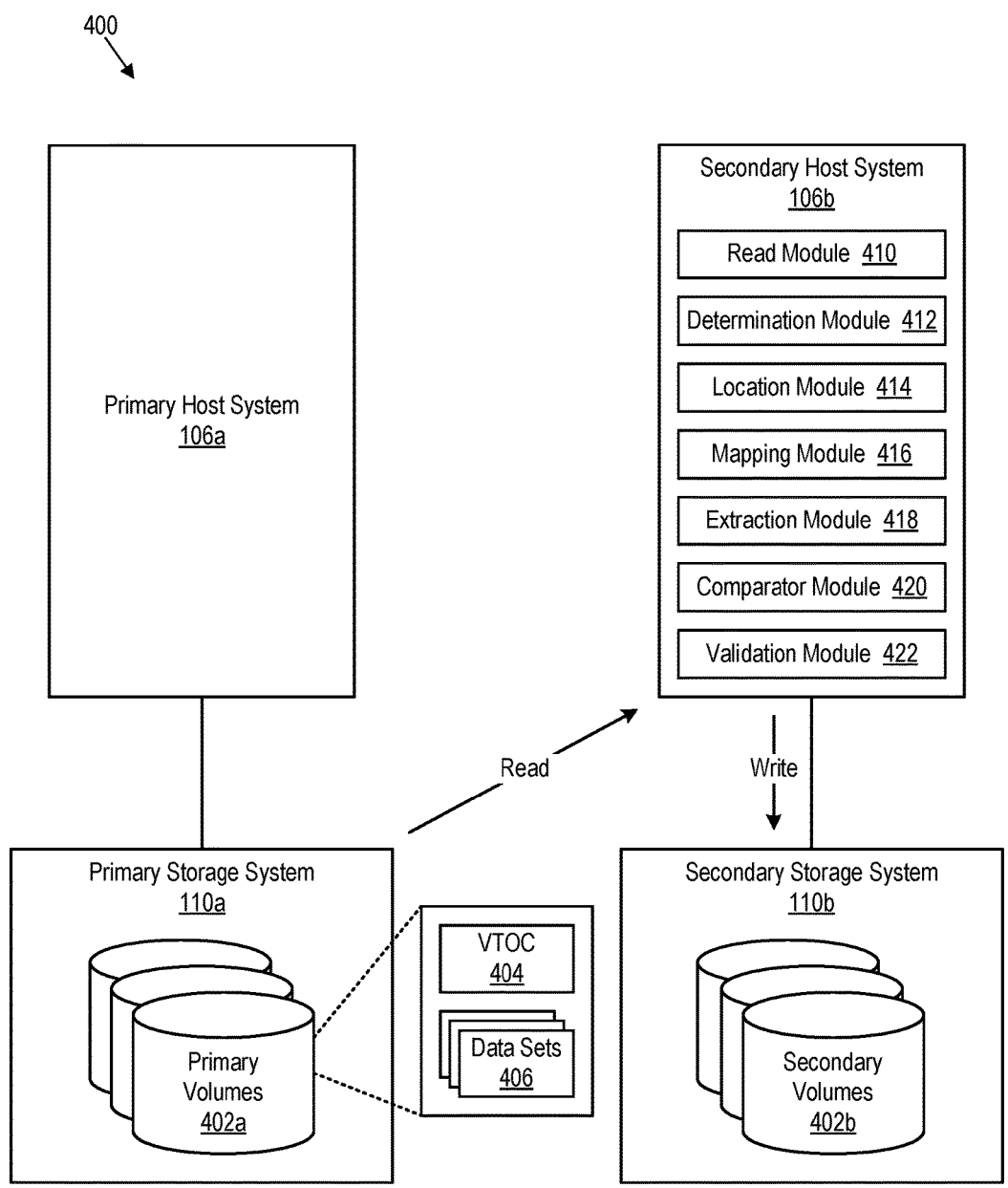
FIG. 4 is a high-level block diagram showing a first exemplary environment for implementing a system and method in accordance with the invention.

Referring to FIG. 4, a high-level block diagram showing a first exemplary environment for implementing a system and method in accordance with the invention is illustrated. In the illustrated environment, data is asynchronously mirrored from primary volumes 402a, hosted on a primary storage system 110a, to secondary volumes 402b, hosted on a secondary storage system 110b, in order to maintain two consistent copies of the data. The primary and secondary storage systems 110a, 110b may be located at different sites, perhaps hundreds or even thousands of miles away from one another. In the event the primary storage system 110a fails, I/O may be redirected to the secondary storage system 110b, thereby enabling continuous operations.

As shown in FIG. 4, data may be stored on the primary volumes 402a in the form of data sets 406, including extended format data sets 406 and non-extended-format data sets 406. Each primary volume 402a may store a volume table of contents (VTOC) 404 to provide a way to locate data sets 406 on the primary volume 402a. The VTOC 404 may list the names of each data set 404 on the primary volume 402a as well as information such as its size, location, and permissions. Additionally, the VTOC 404 may contain an entry for every area of contiguous free space on the primary volume 402a.

As previously mentioned, in data replication systems such as that illustrated in FIG. 4, data corruption may occur on the primary volumes 402a. This data corruption may be caused by user error, program code error, malicious activities, or the like. Some of this data corruption may take place outside of normal access methods that are used to access data on the primary volumes 402a and prevent unauthorized access. As a result, certain types of intentional and unintentional data corruption may be present on the primary volumes 402a that goes undetected. In data replication systems such as that illustrated in FIG. 4, this data corruption may be mirrored to the secondary volumes 402b, potentially overwriting valid data on the secondary volumes 402b.

In order to prevent valid data from being overwritten with corrupt data, one or more modules may be provided. In the illustrated embodiment, these modules are provided on the secondary host system 106b, although the modules are not limited to this location. These modules may be implemented in software, hardware, firmware, or a combination thereof. The modules are presented by way of example and not limitation. More or fewer modules may be provided in different embodiments. For example, the functionality of some modules may, in certain embodiments, be combined into a single or smaller number of modules, or the functionality of a single module may be distributed across several modules.

As shown, the modules include one or more of a read module 410, determination module 412, location module 414, mapping module 416, extraction module 418, comparator module 420, and validation module 422. When data is to be copied from the primary volumes 402a to the secondary volumes 402b (such as when a consistency group is formed), the read module 410 may read an element of data (e.g., a block 302 of data, a track 300 of data, etc.) from the primary volumes 402a. The determination module 412 may then determine whether the data element is associated with an extended format data set or a non-extended-format data set, such as by looking for the existence of metadata appended to the data element, or determining whether the data element is associated with an extended format data set in the VTOC 404. If the data element is associated with a non-extended-format data set (i.e., no metadata attached), the data element may be copied to the secondary volumes 402b without any validation.

If, on the other hand, the data element is associated with extended format data set, the location module 414 may determine a location (e.g., offset) of the data element within the secondary volumes 402b. The mapping module 416 may then map this location to a particular extended format data set referenced in a volume table of contents (VTOC 404) associated with the primary volume 402a. The extraction module 418 may extract an identifier (e.g. creation date, volume name, etc.) associated with the extended format data set from the VTOC 404, and a corresponding identifier (e.g. creation date, volume name, etc.) from the metadata associated with the data element. The comparator module 420 may then compare these indicators to determine if there is a match.

If the indicators match, this may indicate that the data element contains valid data that is associated with the extended format data set referenced in the VTOC 404 (i.e., the data element does not contain corrupt data). In such a case, the validation module 422 may validate the data element and the data element may be copied from the primary volume 402a to the secondary volume 402b. If, on the other hand, the indicators do not match (e.g., the creation dates or volume names differ), this may indicate that the data element is not associated with the extended format data set referenced in the VTOC 404 and thus may contain corrupt data. In such a case, the validation module 422 may not validate the data element and the data element may not be copied from the primary volume 402a to the secondary volume 402b. In this way, data may be validated prior to being copied from the primary volume 402a to the secondary volume 402b.

Figure 5:
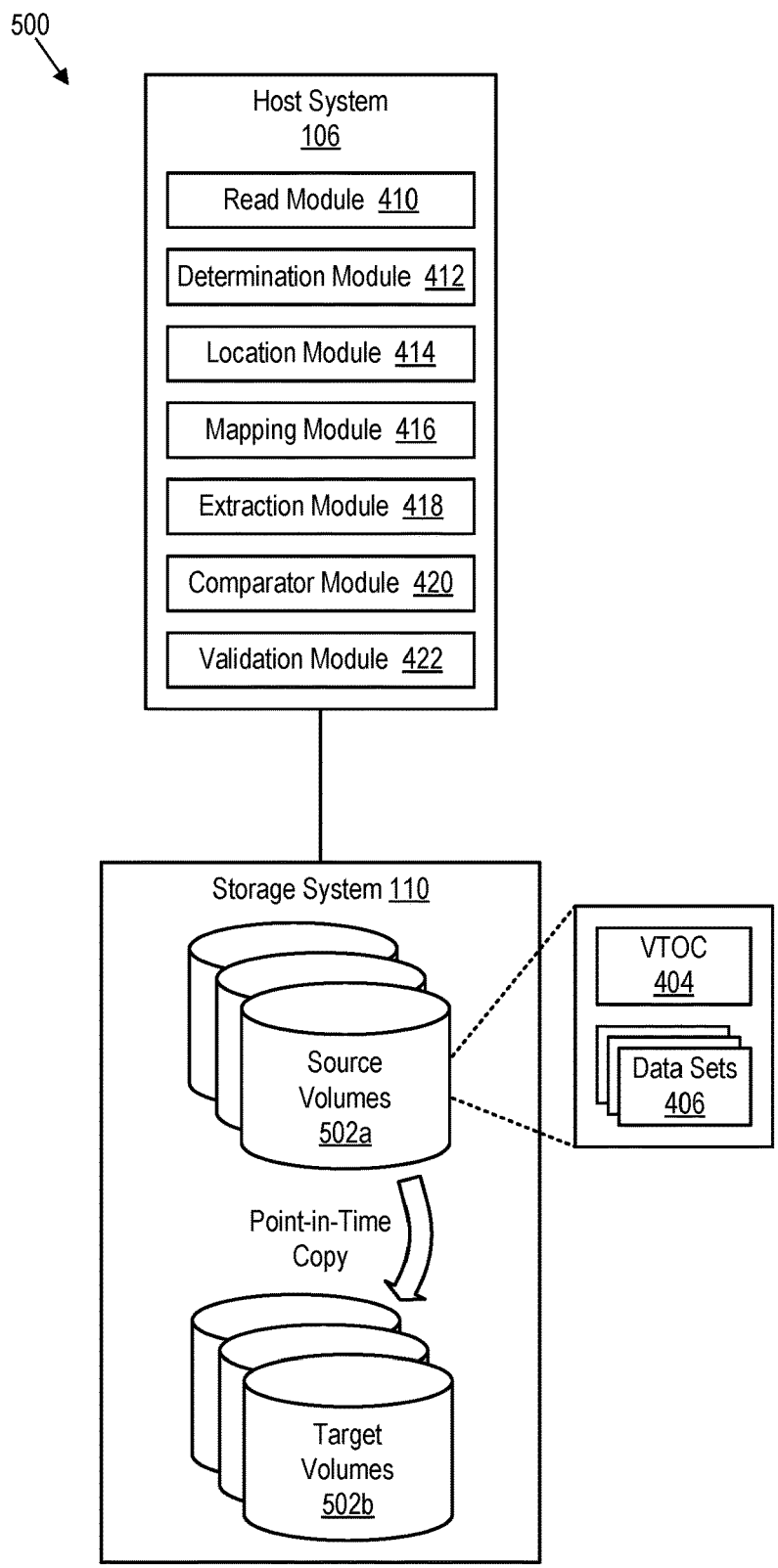
FIG. 5 is a high-level block diagram showing a second exemplary environment for implementing a system and method in accordance with the invention.

Referring to FIG. 5, a high-level block diagram showing a second exemplary environment for implementing a system and method in accordance with the invention is illustrated. In the illustrated environment, data is stored in source volumes 502a of a storage system 110. A snapshot (i.e. point-in-time copy) is periodically taken of data in the source volumes 502a and stored in the target volumes 502b. This may be performed using a copy function such as IBM's FlashCopy Like the previous example, each source volume 502a may include a VTOC 404 and one or more data sets 406. These data sets 406 may, in certain embodiments, include non-extended-format data sets and/or extended format data sets. In order to prevent valid data on the target volumes 502b from being overwritten with corrupt data, the modules previously discussed in association with FIG. 4 may be used to validate data before it is copied from the source volumes 502a to the target volumes 502b. The modules may function in much the same manner described in association with FIG. 4.

Figure 6:
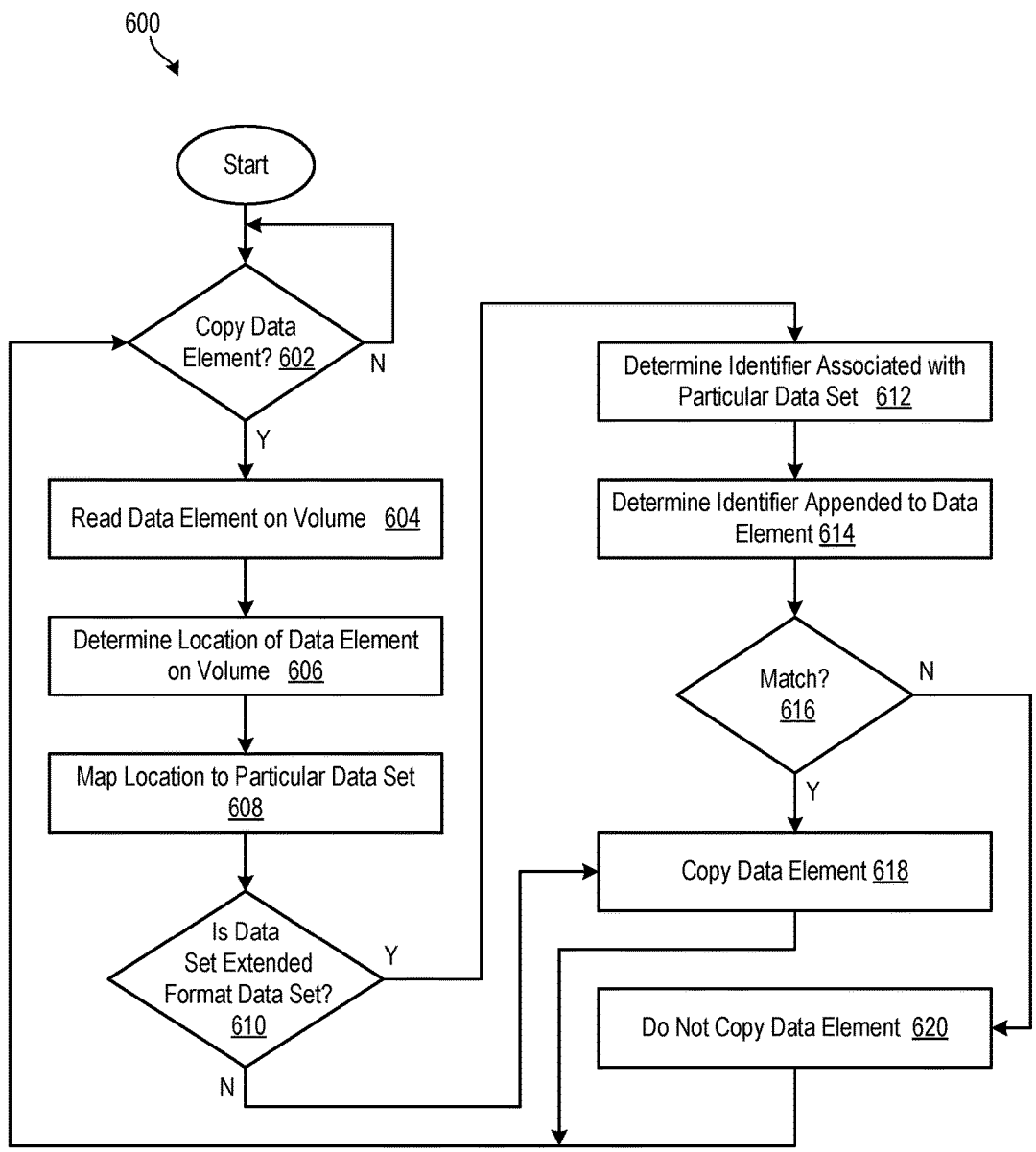
FIG. 6 is a process flow diagram showing a method for validating data.

Referring to FIG. 6, one embodiment of a method 600 for validating data is illustrated. As shown, the method 600 initially determines 602 whether a data element is to be copied from a first volume to a second volume. If so, the method 600 reads 604 the data element on the first volume and determines 606 a location of the data element on the volume. The method 600 then maps this location to a particular data set. In certain embodiments, the method 600 maps the location to a particular data set using a VTOC 404 associated with the first volume.

The method may then determine 610 whether a data set is an extended format data set. This may be accomplished, for example, by determining whether metadata is appended to the data element or determining whether the data set is identified as an extended format data set in the VTOC 404. If the data set is not an extended format data set, the method 600 copies 618 the data element from the first volume to the second volume without any validation and the method 600 repeats.

If the data set is a extended format data set, the method 600 determines an identifier (e.g., creation date, volume name, etc.) associated with the particular data set. This information may be extracted from the VTOC 404. The method 600 may similarly determine 614 an identifier (e.g., creation date, volume name, etc.) associated with the data element. This may be accomplished by analyzing the metadata associated with the data element.

If the identifiers match at step 616, this may indicate that the data element contains valid data. In such a case, the method 600 may copy 618 the data element from the first volume to the second volume. In certain embodiments, this copy may occur when the next consistency group is applied to the second volume. If the identifiers do not match at step 616, this may indicate that the data element potentially contains corrupt data. In such a case, the method 600 may refrain 620 from copying the data from the first volume to the second volume. In certain embodiments, this may be accomplished by omitting the potentially corrupt data element from the next consistency group. In certain embodiments, an error message may be generated for all data elements and/or data sets that failed the validation process.

The method 600 described in FIG. 6 is not limited to validating data that is copied from one location to another. In other embodiments, the method 600 described in association with FIG. 6 may be used to validate data in place. For example, the method 600 may be used to analyze each data element in a volume and determine whether the data element corresponds to an extended format data set identified in a VTOC 404, or potentially contains corrupt data. This may be accomplished in the same manner described in association with FIG. 6.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for validating data, the method comprising:
reading a data element from a volume;
determining a location of the data element within the volume;
mapping the location to a particular data set stored on the volume;
determining a first identifier associated with the particular data set;
comparing the first identifier to a second identifier appended to the data element; and
if the first identifier matches the second identifier, validating the data element.

2. The method of claim 1, wherein mapping the location to the particular data set comprises mapping the location to the particular data set in a volume table of contents (VTOC) associated with the volume.

3. The method of claim 1, wherein the particular data set is an extended format data set.

4. The method of claim 1, wherein the first identifier is a creation date associated with the data set.

5. The method of claim 1, wherein the second identifier is extracted from an affix appended to the data element.

6. The method of claim 5, wherein the second identifier is metadata associated with the data element.

7. The method of claim 1, in the event the data element is validated, copying the data element from the volume to another volume.

8. A computer program product for validating data, the computer program product comprising a computer-readable storage medium having computer-usable program code embodied therein, the computer-usable program code configured to perform the following when executed by at least one processor:
read a data element from a volume;
determine a location of the data element within the volume;
map the location to a particular data set stored on the volume;
determine a first identifier associated with the particular data set;
compare the first identifier to a second identifier appended to the data element; and
if the first identifier matches the second identifier, validate the data element.

9. The computer program product of claim 8, wherein mapping the location to the particular data set comprises mapping the location to the particular data set in a volume table of contents (VTOC) associated with the volume.

10. The computer program product of claim 8, wherein the particular data set is an extended format data set.

11. The computer program product of claim 8, wherein the first identifier is a creation date associated with the data set.

12. The computer program product of claim 8, wherein the second identifier is extracted from an affix appended to the data element.

13. The computer program product of claim 12, wherein the second identifier is metadata associated with the data element.

14. The computer program product of claim 8, wherein the computer-usable program code is further configured to, in the event the data element is validated, copy the data element from the volume to another volume.

15. A system for validating data, the system comprising:
at least one processor;
at least one memory device operably coupled to the at least one processor and storing instructions for execution on the at least one processor, the instructions causing the at least one processor to:
read a data element from a volume;
determine a location of the data element within the volume;
map the location to a particular data set stored on the volume;
determine a first identifier associated with the particular data set;
compare the first identifier to a second identifier appended to the data element; and
if the first identifier matches the second identifier, validate the data element.

16. The system of claim 15, wherein mapping the location to the particular data set comprises mapping the location to the particular data set in a volume table of contents (VTOC) associated with the volume.

17. The system of claim 15, wherein the particular data set is an extended format data set.

18. The system of claim 15, wherein the first identifier is a creation date associated with the data set.

19. The system of claim 15, wherein the second identifier is extracted from an affix appended to the data element.

20. The system of claim 15, wherein the instructions further cause the at least one processor to, in the event the data element is validated, copy the data element from the volume to another volume.

* * * * *